United States Patent Office 3,110,724 Patented Nov. 12, 1963

1

3,110,724

POLYOXYESTERS OF BENZOYLBENZOIC ACID

Joseph E. Woodbridge, Wynnewood, and Frederick R. Lawrence, Broomall, Pa., assignors to The Atlantic Refining Company, Philadelphia, Pa., a corporation of Pennsylvania No Drawing. Filed Apr. 12, 1961, Ser. No. 102,374
6 Claims. (Cl. 260—469)

This invention relates to novel organic compounds having particular utility as low-foaming, stable synthetic non-ionic detergents. More particularly, this invention relates to novel organic compounds having the following general formula

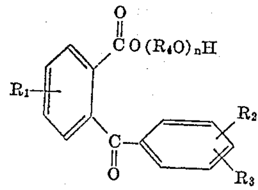

wherein $R_1$, $R_2$, and $R_3$ may be either hydrogen atoms or alkyl radicals containing up to 24 carbon atoms, $R_4$ is an alkylene radical containing from 2 to 4 carbon atoms and $n$ ranges from about 5 to about 25.

It is known in the art that non-ionic synthetic detergents of the alkylene oxide condensate type have high detergency-low foaming characteristics which make them particularly suitable for home laundry and dishwashing machines, as well as for many industrial purposes.

The products of the instant invention possess these characteristics to a superior extent and, in addition, remain stable for prolonged periods of time.

It is, therefore, an object of this invention to produce non-ionic synthetic detergents having superior detergency properties.

It is another object of this invention to produce non-ionic synthetic detergents having low-foaming characteristics.

It is another object of this invention to produce non-ionic synthetic detergents which remain stable over prolonged periods of time.

It is another object of this invention to produce non-ionic synthetic detergents which can be readily and economically spray dried or drum dried with builders to yield powdered products having high detergency-low foaming properties.

Other objects and advantages will become apparent from a reading of the following description and the appended claims.

As stated above, the non-ionic synthetic detergents of the instant invention have the following general formula:

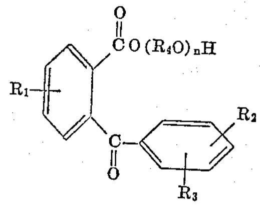

wherein $R_1$, $R_2$, and $R_3$ may be either hydrogen atoms or alkyl radicals containing up to 24 carbon atoms, $R_4$ is an alkylene radical containing from 2 to 4 carbon atoms and $n$ may range from about 5 to about 25. Examples of such compounds include polyalkoxy-o-(p-alkyl benzoyl) benzoates such as polyethoxy-o-(p-dodecyl benzoyl) benzoate, polyethoxy-o-(p-t-butyl benzoyl) benzoate, polyethoxy-o-(p-toluyl) benzoate, polypropoxy-o-(p-dodecyl benzoyl) benzoate, polypropoxy-o-(p-t-butyl benzoyl) benzoate, polypropoxy-o-(p-toluyl) benzoate, polybutoxy-o-(p-dodecyl benzoyl) benzoate, polybutoxy-o-(p-t-butyl benzoyl) benzoate, polybutoxy-o-(p-toluyl) benzoate; polyalkoxy-o-(p-alkyl benzoyl) alkyl benzoates, such as polyethoxy-o-(p-dodecyl benzoyl) methyl benzoate, polyethoxy-o-(p-t-butyl benzoyl) methyl benzoate, polyethoxy-o-(p-toluyl) methyl benzoate, polyethoxy-o-(p-toluyl) t-butyl benzoate, polypropoxy-o-(p-dodecyl benzoyl) methyl benzoate, polypropoxy-o-(p-t-butyl benzoyl) methyl benzoate, polypropoxy-o-(p-toluyl) methyl benzoate, polypropoxy-o-(p-dodecyl benzoyl) t-butyl benzoate, polybutoxy-o-(p-dodecyl benzoyl) methyl benzoate, polybutoxy-o-(p-t-butyl benzoyl) methyl benzoate, polybutoxy-o-(p-toluyl) methyl benzoate, polybutoxy-o-(p-t-butyl benzoyl) dodecyl benzoate; polyalkoxy-o-(dialkyl benzoyl) benzoates such as polyethoxy-o-(di-t-butyl benzoyl) benzoate, polyethoxy-o-(xyloyl) benzoate, polypropoxy-o-(di-t-butyl benzoyl) benzoate, polypropoxy-o-(xyloyl) benzoate, polybutoxy-o-(di-t-butyl benzoyl) benzoate, polybutoxy-o-(xyloyl) benzoate; polyalkoxy-o-(dialkyl benzoyl) alkyl benzoates such as polyethoxy-o-(di-t-butyl benzoyl) methyl benzoates, polyethoxy-o-(xyloyl) methyl benzoate, polyethoxy-o-(xyloyl)-butyl benzoate, polypropoxy-o-(di-t-butyl benzoyl) methyl benzoate, polypropoxy-o-(xyloyl) methyl benzoate, polypropoxy-o-(xyloyl) t-butyl benzoate, polybutoxy-o-(di-t-butyl benzoyl) methyl benzoate, polybutoxy-o-(xyloyl) methyl benzoate and polybutoxy-o-(xyloyl) t-butyl benzoate.

2

The novel compounds of this invention are prepared by reacting the condensation product of phthalic anhydride or an alkyl phthalic anhydride and a mono- or dialkyl benzene with an alkylene oxide or a polyalkylene glycol.

These mono- or dialkyl benzenes to be condensed with phthalic anhydride or an alkyl phthalic anhydride may be prepared by any of a number of well-known conventional methods, for example, by the alkylation of benzene with a straight-chain olefin or a branched-chain olefin in the presence of a catalyst such as $AlCl_3$, HF, $H_2SO_4$, $BF_3$ or similar acid-type catalyst. The branched-chain olefins preferably may be obtained from the polymerization of propylene over phosphoric acid or similar catalyst, or by the polymerization of butylenes, by the dimerization of $C_6$ to $C_9$ olefins and like reactions; however, since these reactions produce compounds having molecular weights greater and less than those desired, care must be taken to separate and use only those polymers which fall within the desired range. The straight-chain olefins may be obtained by the cracking of wax to produce straight-chain alpha olefins and the desired molecular weight range obtained by fractionation.

Another method of preparation involves the reaction of an alcohol with benzene in the presence of such catalysts as $H_2SO_4$, $BF_3$, $BF_3$—$H_2SO_4$, $BF_3$—$H_3PO_4$, or $AlCl_3$. The alcohols may be obtained by the reaction of an olefin with carbon monoxide and hydrogen in the so-called "Oxo" process, or by the oxidation of paraffinic hydrocarbons.

A third method of preparation of the alkyl benzenes employs a chlorinated hydrocarbon reacted with benzene in the presence of a Friedel-Crafts catalyst such as $AlCl_3$. The alkyl halide may be conveniently obtained by chlorinating the proper petroleum fraction such as a kerosene fraction.

The reactions involved in the preparation of the novel compounds of this invention may be depicted as follows:

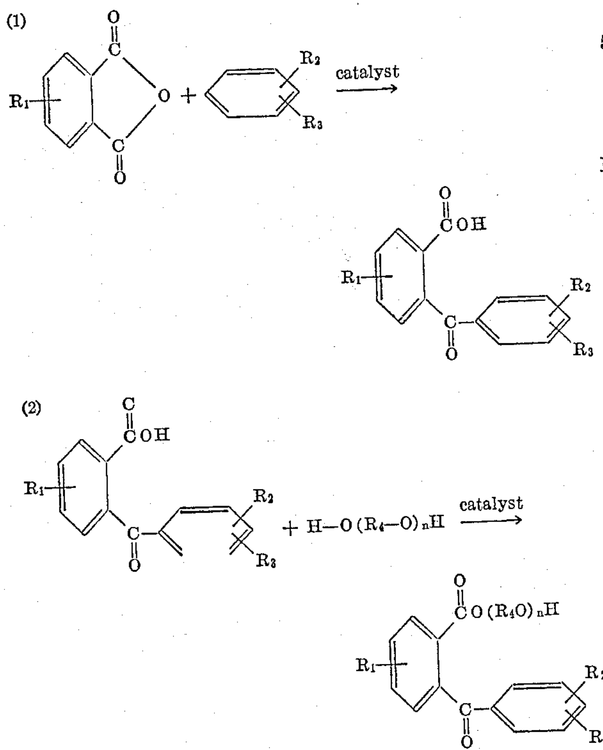

In the foregoing equations $R_1$, $R_2$, and $R_3$ may be hydrogen or alkyl radicals containing up to 24 carbon atoms, $R_4$ is an alkylene radical and $n$ ranges from about 5 to 25.

Thus, in accordance with this invention a substituted benzoyl benzoic acid may be directly esterified with a polyalkylene glycol (such as polyethylene glycol, polypropylene glycol and polybutylene glycol) in the presence of an acidic catalyst at a temperature of from about 100° C. to about 250° C. Although the esterification reaction may be carried out at temperatures ranging between 100° C. and 250° C., it is preferable to carry out the reaction at temperatures ranging between 140° C. and 210° C. and most preferably at 160° C. to 190° C.

The polyalkylene glycol reactant which may be used in this invention has a molecular weight of from about 550 to about 1000. When using a polyalkylene glycol reactant the reaction is carried out in the presence of from about 0.1 weight percent to about 0.5 weight percent of a highly acidic catalyst such as a sulfonic acid catalyst, xylene sulfonic acid being preferred. Although the catalyst may be omitted, the reaction time is considerably shortened in its presence.

Instead of using a polyalkylene glycol reactant in this invention, an alkylene oxide may be used. The condensation reaction is conducted at 100° C. to about 250° C., preferably at 140° C. to 210° C. The alkylene oxide is reacted with the substituted benzoyl benzoic acid until the mole ratio of alkylene oxide to substituted benzoyl benzoic acid is from about 5:1 to about 25:1. Mole ratios of 10:1 to 20:1 are preferred with mole ratios of from 12:1 to 14:1 being most preferred.

The catalyst used when condensing an alkylene oxide with a substituted benzoyl benzoic acid may be any basic catalyst such as KOH, LiOH, NaOH, metallic sodium, a mixture of sodium hydroxide, and sodium glycerophosphate, $K_2CO_3$ or $Na_2CO_3$. The alkali metal hydroxides and potassium carbonate are the most preferred catalysts. The catalyst may be added either in aqueous or solid form, but it is preferred to use solid catalysts. About 1 weight percent to about 13 weight percent of the catalyst based on the weight of the substituted benzoyl benzoic acid may be used, 1 weight percent to 4 weight percent being preferred.

While the novel compounds of this invention may be prepared using either an alkylene oxide or a polyalkylene glycol, it is preferred to use a polyethylene glycol having an average molecular weight of from about 550 to about 1000, preferably about 575 to 650, and most preferably about 600.

Exceptionally high detergency values have been obtained consistently from the product resulting from the direct esterification of a substituted benzoyl benzoic acid such as o-(p-t-butyl benzoyl) benzoic acid, o-(p-dodecyl benzoyl) benzoic acid, and o-(di-t-butyl benzoyl) benzoic acid with a polyethylene glycol having a molecular weight of from about 575 to about 650.

In a specific embodiment of this invention a polyethylene glycol having a molecular weight of about 600 is esterified with a substituted benzoyl benzoic acid to produce materials having good to excellent detergency. The substituted benzoyl benzoic acid and polyethylene glycol are placed in a glass or stainless steel apparatus, catalyst is added, and the reactants are heated to 140° C. to 210° C. The rate of reaction increases as the temperature increases.

The novel compounds of this invention have a characteristic odor which may be removed by blowing the product with nitrogen or by steam stripping.

The color of the non-ionic detergents of this invention may be improved by bleaching with from 1 to about 5 volume percent of 30 percent aqueous hydrogen peroxide.

Various salts and suspending agents may be added to the pure detergent of this invention to augment its detergency. These are termed "builders" and are usually phosphates, silicates, sulfates, carboxymethyl cellulose, and a wide variety of other materials. Built formulations prepared from the products of the instant invention gave excellent high detergency-low foam results as will be shown hereinafter. The following builder formulation was used to evaluate the detergency of the novel compounds of this invention:

15% by weight compounds of this invention
50% by weight sodium tripolyphosphate
33% by weight sodium sulfate
2% by weight carboxymethyl cellulose The synthetic detergents of this invention may be spray dried or drum dried with builders to form powders. In spray drying the built detergent slurry is pumped to the top of a high tower and fed in a series of sprays at a temperature of about 150° F. The droplets are met by a concurrent stream of high temperature gas at 550° F. to 650° F. inlet and 250° F. to 300° F. outlet which evaporates the water from the droplets leaving them in the form of solid detergent particles on falling. Drum drying of the built detergent slurry may be accomplished in conventional equipment using about 100 pounds steam pressure in the drums.

The substituted benzoyl benzoic acids which are reacted with an alkylene oxide or a polyalkylene glycol to form the novel compounds of this invention may be prepared by known methods, for example, by condensing an alkyl benzene with phthalic anhydride in the presence of a Friedel-Crafts type catalyst. In Organic Synthesis, Collective, volume I, second edition, edited by Gilman and Black at page 517, there is shown the preparation of p-toluyl-o-benzoic acid in a 96 percent yield by reacting 0.68 mole of phthalic anhydride with 4.35 moles of toluene in the presence of 1.5 moles of aluminum chloride as a catalyst.

The built non-ionic detergents were tested in a standard Launderometer apparatus. The procedure and method of calculating detergency values differ in minor detail from that shown in "Carbon Soil Removal," P. T. Vitale et al., Soap and Chemical Specialties, volume 32, No. 6, pp. 41–44 (June 1956), and are described below. The Launderometer consists of a spindle mechanism rotating in a hot water thermostated bath. Mason jars of 1 pint capacity containing detergent, water, soiled cloth, and balls for agitation are rotated on the spindle mechanism for a set time at a set rate in the hot water. The degree of cleaning is determined and the resulting numbers are the detergency values. These values are correlated with a standard anionic detergent having an arbitrarily assigned detergency value and a standard non-ionic detergent having an assigned detergency value based on the standard anionic detergent.

The detergency tests are conducted in the following manner.

The new cloth is cut into 4-inch wide strips across the bolt. Six strips are rolled up together and extracted with 500 cc. of acetone for 6 hours in a Soxhlet extraction apparatus. The strips are then removed and rinsed 3 times in distilled water, air dried until just barely damp, ironed until completely dry, and then placed in a 200° F. oven for 3 hours. At the end of this time they are removed from the oven and set in a desiccator in a temperature and humidity controlled room.

The strips of cloth are soiled with the following composition:

0.9 g. commercial hydrogenated vegetable oil (trademarked Crisco)
3.1 g. a U.S.P. grade mineral white oil
1.0 g. lampblack
500 ml. carbon tetrachloride.

The hydrogenated vegetable oil, mineral white oil and lampblack are mixed with sufficient carbon tetrachloride to just dissolve the oil and fat. The concentrated soil slurry is then passed through a small, hand-operated homogenizer and the balance of the carbon tetrachloride added. About 200 ml. of soil is placed in a nine-inch evaporating dish and a strip of the cloth is passed through this rapidly and smoothly three times. The cloth is hung to dry at room temperature for 2 hours ±15 minutes and is then cut into 2-inch by 4-inch swatches and read photometrically. The photometer is calibrated against a magnesia block with the standard equal to 100.

One pint Mason jars are washed and set in the Launderometer rack. They are each filled with 6 ml. of 5 percent by weight solution of the above mentioned built composition, 10 three-eighth inch diameter hard rubber balls, one soiled swatch, and enough 300 p.p.m. or 30 p.p.m. ("hard" or "soft" water, respectively) hardness water to make 100 ml. of solution. The final concentration of the built composition is 0.3 percent with the concentration of the active compounds of this invention being 0.045 percent by weight. The jars are capped, set on the spindle, and rotated at 40–42 r.p.m. for 20 minutes at 120° F. The jars are immediately removed, the height of the foam above the detergent solution in each jar is immediately noted (following one quick inversion of each jar), and the swatches are dried on paper and photometer readings taken.

The detergency is calculated in the following way, $$\text{Raw detergency}=\frac{R-S}{V-S}\times 100=L$$

where:

$R$=photometric percent reflectance of the washed cloth.
$S$=photometric percent reflectance of the soiled cloth.
$V$=photometric percent reflectance of the virgin cloth.
S usually ranges from 18 to 24.
V is practically a constant at 87.
R varies from 40–80.

The L value is then related to a standard value by a factor to give the final detergency:

$$D=L\times\frac{S_t}{L_s}$$

where:

$S_t$=the arbitrary detergency of the standard.
$L_s$=the L (raw detergency) value for the standard which is always run concurrently with the material being tested.

An arbitrary detergency ($S_t$) of 70 is assigned to a commonly used commercial anionic detergent which is employed as the standard. A non-ionic commercial detergent is used as a secondary standard and is assigned a detergency of 80 based on the assigned value of 70 for the standard anionic.

The detergency data obtained by testing various representative compounds of this invention in the examples which follow not only demonstrate the utility of the invention, but also demonstrate the superiority of these compounds over the standard anionic and non-ionic detergents available commercially.

The following examples are illustrative of the instant invention and should not be construed as limitative.

*Example I*

Into a glass reaction flask there were placed 25 gm. (0.17 mole) of phthalic anhydride and 147.4 gm. (1.1 moles) of t-butyl benzene. The mixture was cooled with an ice bath to a temperature of 0°–5° C. There was added 50 gm. (0.4 mole) of powdered anhydrous aluminum chloride and the reaction mass was stirred immediately. Upon commencement of the agitation the ice bath was removed and the temperature of the reaction mixture began to increase.

When the evolution of HCl began to slacken, the reaction mixture was then heated to 90° C. and maintained at this temperature for about 1.75 hours.

The heat was then removed and the mixture cooled slowly by the addition of small amounts of ice. There was added slowly 38 cc. of concentrated HCl and the reaction mixture was steam stripped to remove the unreacted t-butyl benzene.

The crude product was separated by filtration and then redissolved in a solution of 10 gm. NaOH in 300 cc. of water. The resulting solution was filtered while hot and the filtrate was acidified with concentrated HCl.

The product was again separated by filtration and washed with water to remove any residual HCl.

There was obtained 45.0 gm. (representing a 93.5 percent yield of theory) of (p-t-butyl benzoyl)-o-benzoic acid.

*Example II*

To a glass reaction vessel containing 11.32 gm. (0.04 mole) of (p-t-butyl benzoyl)-o-benzoic acid prepared in Example I, there were added 24 gm. (0.4 mole) of polyethylene glycol having a molecular weight of about 600 and 0.024 gm. of xylene sulfonic acid as a catalyst.

The reaction mixture was heated with stirring at a temperature of 160° C. to 170° C. for 8 hours. A sample was removed from the reaction mixture after 4 hours and tested for detergency in the built formulation described above. This sample was designated sample "A."

After the 8-hour reaction period a second sample "B" was tested for detergency in the built formulation described above.

Table I summarizes the detergencies and foam heights at 0.3 concentration, in 300 p.p.m. hardness water, of the built detergent composition.

*Example III*

Into a glass reaction flask there were placed 148 gm. (1.0 mole) of phthalic anhydride and 492 gm. (2.0 moles) of dodecyl benzene. The mixture was heated with stirring to a temperature of 70° C. There was added 133 gm. (1.0 mole) of powdered anhydrous aluminum chloride. The temperature was raised to 85° C. and an additional 133 gm. of aluminum chloride was slowly added.

When the evolution of HCl began to slacken, the reaction mixture was then heated to 90° C. and maintained at this temperature for about 2 hours.

The heat was then removed and the mixture poured slowly into about 1 liter of warm water. There was also added slowly 150 cc. of concentrated HCl.

The crude product was separated by decantation and then mixed with a solution of 10 gm. NaOH, in 300 cc. of water. The resulting mixture was separated and the aqueous layer was acidified with concentrated HCl and extracted with ether.

There were obtained 320 gm. (representing an 81.2 percent yield of theory) of (p-dodecyl benzoyl)-o-benzoic acid.

*Example IV*

To a glass reaction vessel containing 7.88 gm. (0.02 mole) of (p-dodecyl benzoyl)-o-benzoic acid prepared in Example III, there were added 12 gm. (.02 mole) of polyethylene glycol having a molecular weight of about 600 and 0.012 gm. of xylene sulfonic acid as a catalyst.

The reaction mixture was heated with stirring at a temperature of 160° C. to 170° C. for 23 hours. A sample was removed from the reaction mixture after 9 hours and tested for detergency in the built formulation described above. This sample was designated sample "C."

After the 23-hour reaction period a second sample "D" was tested for detergency in the built formulation described above.

Table I summarizes the detergencies and foam heights at 0.3 concentration, in 300 p.p.m. hardness water, of the built detergent composition.

*Example V*

Into a glass reaction flask there were placed 74 gm. (0.5 mole) of phthalic anhydride and 285 (1.5 moles) of di-t-butyl benzene. The mixture was heated with stirring to a temperature of 70° C. There was added 146 gm. (1.1 moles) of powdered anhydrous aluminum chloride. The temperature was raised to 85° C. and maintained at this temperature for one hour.

The heat was then removed and the mixture poured slowly into about 1 liter of warm water. The crude product was extracted with benzene and mixed with a solution of 10 gm. NaOH, in 300 cc. of water. The resulting mixture was separated by decantation and the aqueous layer was acidified with concentrated HCl and extracted with benzene.

There were obtained 164 gm. (representing a 97 percent yield of theory) of (p-di-t-butyl benzoyl)-o-benzoic acid.

*Example VI*

To a glass reaction vessel containing 13.56 gm. (0.04 mole) of (di-t-butyl benzoyl)-o-benzoic acid prepared in Example V there was added 24 gm. (.04 mole) of polyethylene glycol having a molecular weight of about 600 and 0.025 gm. of xylene sulfonic acid as a catalyst.

The reaction mixture was heated with stirring at a temperature of 160° C. to 170° C. for 16 hours. A sample was removed from the reaction mixture after 11 hours and tested for detergency in the built formulation described above. This sample was designated sample "E."

After the 16-hour reaction period a second sample "F" was tested for detergency in the built formulation described above.

Table I summarizes the detergencies and foam heights at 0.3 concentration, in 300 p.p.m. hardness water, of the built detergent composition.

TABLE I

| Sample Number | Detergency at 0.3% Concentration vs. Std. Anionic Having Detergency of 70 | Detergency at 0.3% Concentration vs. Std. Nonionic Having Detergency of 80 | Foam Height (Inches) |
|---|---|---|---|
| Example II "A" | 77 | | ¼ |
| Example II "B" | 76 | | 0 |
| Example IV "C" | 85 | | 0 |
| Example IV "D" | 92 | 87 | 0 |
| Example VI "E" | 90 | | 0 |
| Example VI "F" | 92 | 87 | 0 |

These data show that the detergencies of the novel compounds of this invention were as good or better than known anionic and non-ionic detergents and, in addition, the foam was so low as to be negligible.

We claim:

1. A compound having the formula

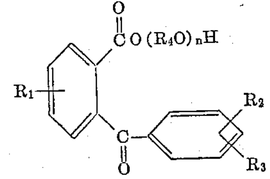

wherein $R_1$, $R_2$, and $R_3$ are selected from the group consisting of hydrogen and alkyl containing up to 24 carbon atoms, $R_4$ is alkylene containing from 2 to 4 carbon atoms and $n$ may range from 5 to 25.

2. A compound according to claim 1 in which $n$ has a value of from 10 to 20.

3. A compound according to claim 1 in which $n$ has a value of from 12 to 14.

4. A compound having the formula

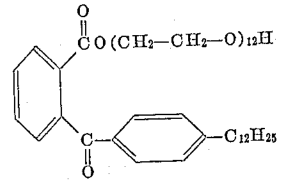

5. A compound having the formula

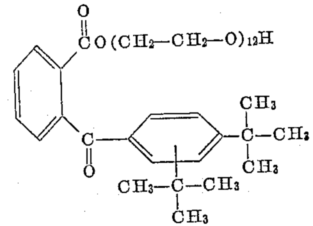

6. A compound having the formula

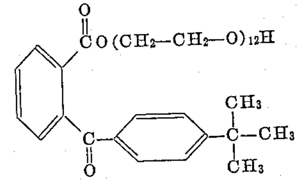

References Cited in the file of this patent

UNITED STATES PATENTS

| | | |
|---|---|---|
| 2,036,271 | Hahn | Apr. 7, 1936 |
| 2,566,205 | Hunn | Aug. 28, 1951 |
| 2,714,607 | Matter | Aug. 2, 1955 |
| 2,840,594 | Coates et al. | June 24, 1958 |